UNITED STATES PATENT OFFICE.

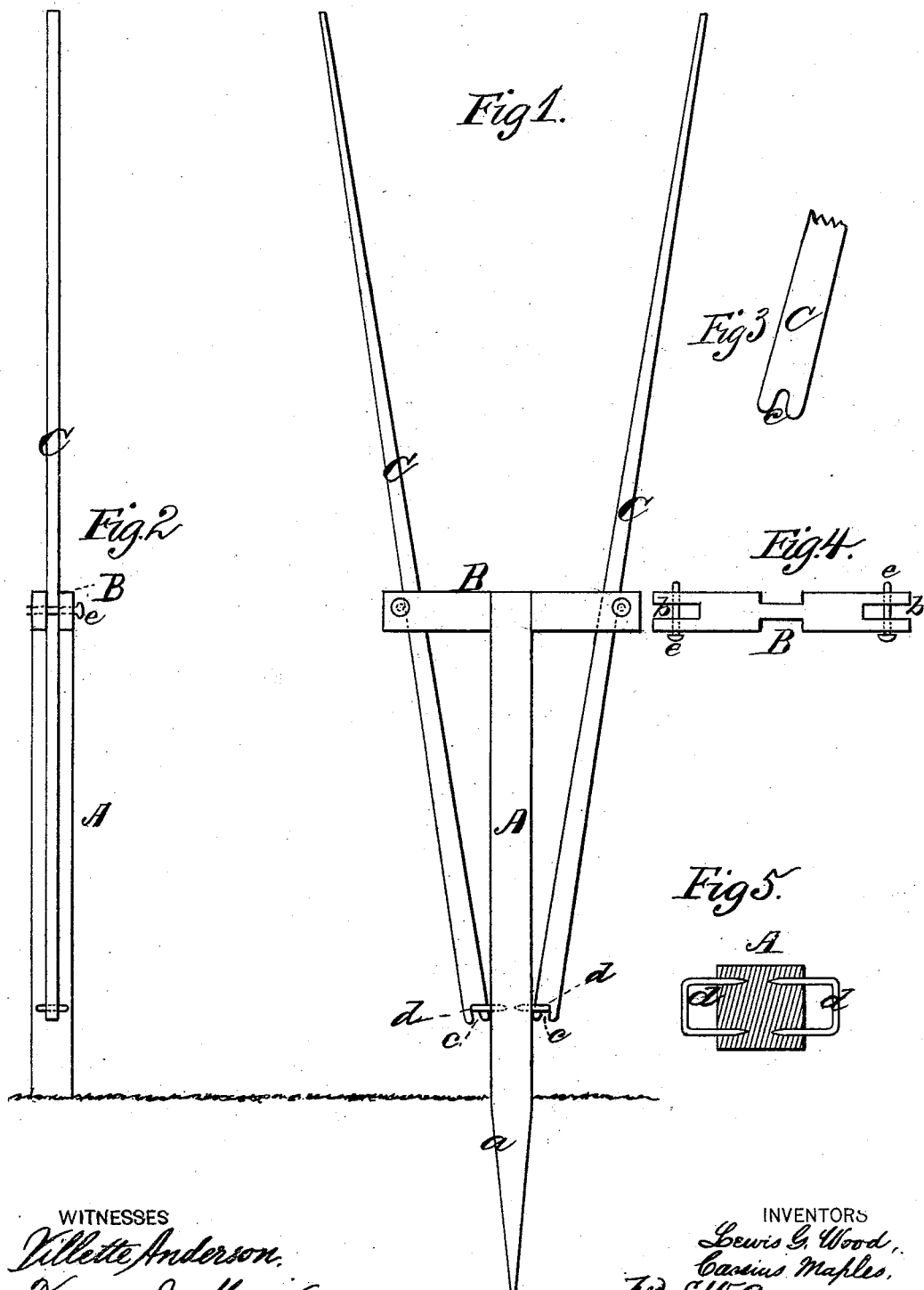

LEWIS G. WOOD AND CASSIUS MAPLES, OF HARTWICK, NEW YORK.

IMPROVEMENT IN HOP-FRAMES.

Specification forming part of Letters Patent No. 188,457, dated March 13, 1877; application filed September 30, 1876.

*To all whom it may concern:*

Be it known that we, LEWIS G. WOOD and CASSIUS MAPLES, of Hartwick, in the county of Otsego and State of New York, have invented a new and valuable Improvement in Hop-Frames; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a front view of our improved hop-pole. Fig. 2 is an edge view thereof; and Figs. 3, 4, and 5 are details.

This invention has relation to improvements in hop poles; and it consists in a frame composed of a stake adapted to be driven into the ground, a cross-piece secured to its upper end, and two vibrating trellis-rods stepped on opposite sides of the stake near its lower end, and removably secured to the ends of the cross-piece, all as hereinafter shown and described.

In the annexed drawings, the letter A designates a wooden upright or post of suitable length, to the upper end of which is removably secured a cross-piece, B. The lower end of upright A is provided with a point, *a*, of suitable length, by means of which it may be driven into the ground. Cross-piece B is provided with a deep vertical notch, *b*, at each end, adapted to receive an inclined rod, C. One of these rods is arranged at each side of the upright, and each will have at its lower end a notch, *c*, by means of which it will be stepped in a metallic staple, *d*, driven into the said upright a short distance above the ground, as shown in Figs. 1 and 2, and on opposite sides thereof. The rods C being first stepped, as above described, will then be passed into the notches *b* at the ends of the cross-piece B, and will be prevented from becoming detached therefrom by means of a removable pin, *e*, passing through the said cross-piece outside of the rods.

This arrangement of a hop-pole possesses singular advantages. In the first place the tying of the vine while growing is dispensed with, it being laid over between the upright and the rods, in which position it will run up and sustain itself upon the latter, thus saving time and labor. If the vine should get free of the rods when near its top, and out of reach, by withdrawing pins *e*, the rods may be swung downward and outward from the upright, and the vine replaced without using a ladder, and the said rods being rigidly held in their relative positions by the cross-piece are prevented from dashing against each other during high winds, and breaking or bruising the vine. If the upright A should break off from any cause, and let the vine down, the rods C may be disengaged from the same with the vine upon them, and a new upright and cross-piece put up without disturbing the vine.

Another and great advantage of our hop-pole is that the poles or uprights A being a permanent fixture the labor of pulling up the poles in ordinary use is dispensed with, our vines being stripped by drawing out pins *e*, and swinging the rods C down, thus bringing the vine throughout its entire ramifications within easy reach. There is, moreover, but one hole in each hill which is occupied by the upright. This prevents water from getting into the ground during rain or snow storms, and, by subsequently freezing, injuring, if not destroying, the vine-roots.

In practice rods C will be preferably slat-shaped—that is, broader than thick—and will be set edgewise to the upright, thus bringing the line of greatest strength in the slat or rod in the direction of the greatest strain.

We are aware that a hop-frame consisting of a cruciform upright, and removable non-vibrating poles diverging therefrom, is not new; hence we do not broadly claim these devices.

What we claim as new, and desire to secure by Letters Patent, is—

In combination with the upright A, having staples *d* upon opposite sides, and the cross-piece B, having notches *b* in its ends, the trellis-pole C, having notch *c*, and the removable pin *e*, substantially as specified.

In testimony that we claim the above we have hereunto subscribed our names in the presence of two witnesses.

LEWIS G. WOOD.
      CASSIUS MAPLES.

Witnesses:
 ESTE R. NORTON,
 THOMAS N. CURRY.